(12) United States Patent
Hornberger et al.

(10) Patent No.: US 11,423,345 B2
(45) Date of Patent: Aug. 23, 2022

(54) METHODS AND SYSTEMS FOR RESOURCE QUEUING AND DELIVERY

(71) Applicant: Spirent Communications, Inc., San Jose, CA (US)

(72) Inventors: Patrick Hornberger, Mountain View, CA (US); Eric Gregory Miller, Lancaster, CA (US); Yujie Lin, San Jose, CA (US); Kalina Stilianova Koinova, Mountain View, CA (US)

(73) Assignee: Spirent Communications, Inc., San Jose, CA (US)

( * ) Notice: Subject to any disclaimer, the term of this patent is extended or adjusted under 35 U.S.C. 154(b) by 101 days.

(21) Appl. No.: 16/810,763

(22) Filed: Mar. 5, 2020

(65) Prior Publication Data

US 2021/0279663 A1    Sep. 9, 2021

(51) Int. Cl.
*G06Q 10/06* (2012.01)
*G06F 16/901* (2019.01)
(Continued)

(52) U.S. Cl.
CPC ... *G06Q 10/06315* (2013.01); *G06F 16/9024* (2019.01); *G06Q 10/083* (2013.01);
(Continued)

(58) Field of Classification Search
None
See application file for complete search history.

(56) References Cited

U.S. PATENT DOCUMENTS 7,260,184 B1 *   8/2007  Howard ............... H04M 3/242
                                                    379/10.01
2002/0162059 A1*  10/2002  McNeely .............. H04L 51/18
                                                    714/703
(Continued)

OTHER PUBLICATIONS

K. Ohmori and K. Ono, "Automated test system with dynamic scheduling for switching systems," ICC '98. 1998 IEEE International Conference on Communications. Conference Record. Affiliated with SUPERCOMM'98 (Cat. No. 98CH36220), 1998, pp. 319-323 vol. 1, doi: 10.1109/ICC.1998.682847. (Year: 1998).*

(Continued)

*Primary Examiner* — Cory W Eskridge
(74) *Attorney, Agent, or Firm* — Haynes Beffel & Wolfeld, LLP; Ernest J. Beffel, Jr.

(57) ABSTRACT

The disclosed technology teaches delivering scarce test equipment resources to a user within a test organization: receiving a test graph that specifies equipment capabilities needed, by class and times when the capabilities are needed. The technology includes maintaining an inventory of equipment resources and capabilities, by class, and responsive to the user invoking the graph, scheduling the needed equipment: identifying alternative resources responsive to the need and selecting a group of resources to schedule; bundling the group of resources to schedule into an immediate bundle needed to start the test and a deferred bundle needed later, after the start of the test; and queuing a deferred bundle reservation for a later time, after the scheduled start of the test. During the test, the technology includes notifying the user of availability of the equipment resources in the deferred bundle when they become available and marking the deferred bundle as in use.

17 Claims, 10 Drawing Sheets

(51) Int. Cl.
*H04J 3/16* (2006.01)
*G06Q 10/08* (2012.01)
*G06Q 10/10* (2012.01)

(52) U.S. Cl.
CPC ......... *G06Q 10/087* (2013.01); *G06Q 10/109* (2013.01); *H04J 3/16* (2013.01)

(56) References Cited

U.S. PATENT DOCUMENTS

| | | | | |
|---|---|---|---|---|
| 2002/0191035 | A1* | 12/2002 | Selent | G06F 3/0481 |
| | | | | 715/866 |
| 2003/0036865 | A1* | 2/2003 | Zhuo | G06Q 10/06 |
| | | | | 702/81 |
| 2004/0162811 | A1* | 8/2004 | Wetzer | G06Q 10/06 |
| 2009/0307763 | A1* | 12/2009 | Rawlins | G06F 11/3672 |
| | | | | 726/5 |
| 2011/0066490 | A1* | 3/2011 | Bassin | G06Q 30/0249 |
| | | | | 705/14.48 |

OTHER PUBLICATIONS

Chandra, Abhishek; et al , "Quantifying the Benefits of Resource Multiplexing in On-Demand Data Centers" (2003). Computer Science Department Faculty Publication Series. 20., 7 pgs, Retrieved from https://scholarworks.umass.edu/cs_faculty_pubs/20.

* cited by examiner

800

824 — // reserve topology containing immediate and deferred resources
velocity_api = new Velocity_API_Client(connectivity_info)
reservation = velocity_api.reserve("R&S_Scenario_topology")
result = reservation.wait_for_activation()
if result.code != SUCCESS:
    exit "Reservation error"

834 — // connect to resources to configure
traffic_gen = reservation.resources["Traffic Gen"]
configure_traffic_gen(traffic_gen.ip_address, configuration_params)
mobile_phone = reservation.resources("RF Chamber").get_children("Mobile Device")
configure_mobile(mobile_phone.eth_port, configuration_params)
establish_call(mobile_phone.eth_port, configuration_params)

854 — // request R&S FSW - will wait until resource is available
reservation.enable("R&S FSW")
result = reservation.wait_for_activation()
if result.code != SUCCESS:
    exit "Reservation error"

874 — // do tests and release critical resource
fsw = reservation.resources["R&S FSW"]
test_results = do_signal_analysis(fsw)
reservation.release(fsw)

// continue with rest of test_results
mobile_results = analyze_mobile(mobile_phone.eth_port)

884 — // shutdown and release
reservation.release()

FIG. 8

METHODS AND SYSTEMS FOR RESOURCE QUEUING AND DELIVERY

FIELD OF THE TECHNOLOGY DISCLOSED

The technology disclosed relates generally to test environment automation for scheduling the allocation and time multiplexing of scarce resources within a test environment, as described by a test graph. More specifically, the technology discloses queuing and a resource multiplexing system.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Ethernet speeds are increasing. Networks are becoming more intelligent. Topologies are scaling to sizes never seen before, which leads to a need for testing a variety of speeds and protocols under realistic conditions. Developers' products and services need to be verified under expected loads in support of this unparalleled port and application scale. The client's test platform supports testing of 400, 200, 100, 50, 40, 25, 10, 5, 2.5 Gigabit Ethernet (GbE) (one billion bits per second) on a single port.

In today's environment, delivering a high quality user experience is more important than ever. A reputation for reliability can create a competitive advantage for new offerings. Maintaining both can be challenging as the number of devices on the network proliferates and the bandwidth the devices consume skyrockets. Testing user experience, reliability and quality allows designers to confidently launch new services dependent on higher speed links using industry-leading speeds in a single module and series of modules. The client is a leader in validating high density, high scale and high quality solutions.

An opportunity arises for delivering scarce test equipment resources to a user within a test organization, thus saving development and test time.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches a method of delivering scarce test equipment resources to a user within a test organization, including receiving via an interface a test graph that specifies equipment capabilities needed, by class, for a test and that further specifies times during the test when the equipment capabilities are needed. The method also includes maintaining an inventory of equipment resources and capabilities, by class, and responsive to the user invoking the test graph, scheduling the needed equipment capabilities. Scheduling includes identifying alternative equipment resources responsive to the equipment capabilities needed, by class, and selecting a group of equipment resources to schedule; and bundling the group of equipment resources to schedule into an immediate bundle of resources needed to start the test and a deferred bundle of resources needed later, after the start of the test. Scheduling also includes queuing a deferred bundle reservation for a later time, after the scheduled start of the test. The disclosed technology further includes, during the test, notifying the user of availability of the equipment resources in the deferred bundle when the deferred bundle becomes available and marking the deferred bundle as in use.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 8 shows an example script 800 for delivering scarce test equipment resources to a user within a test organization.

DETAILED DESCRIPTION

Figure 1:
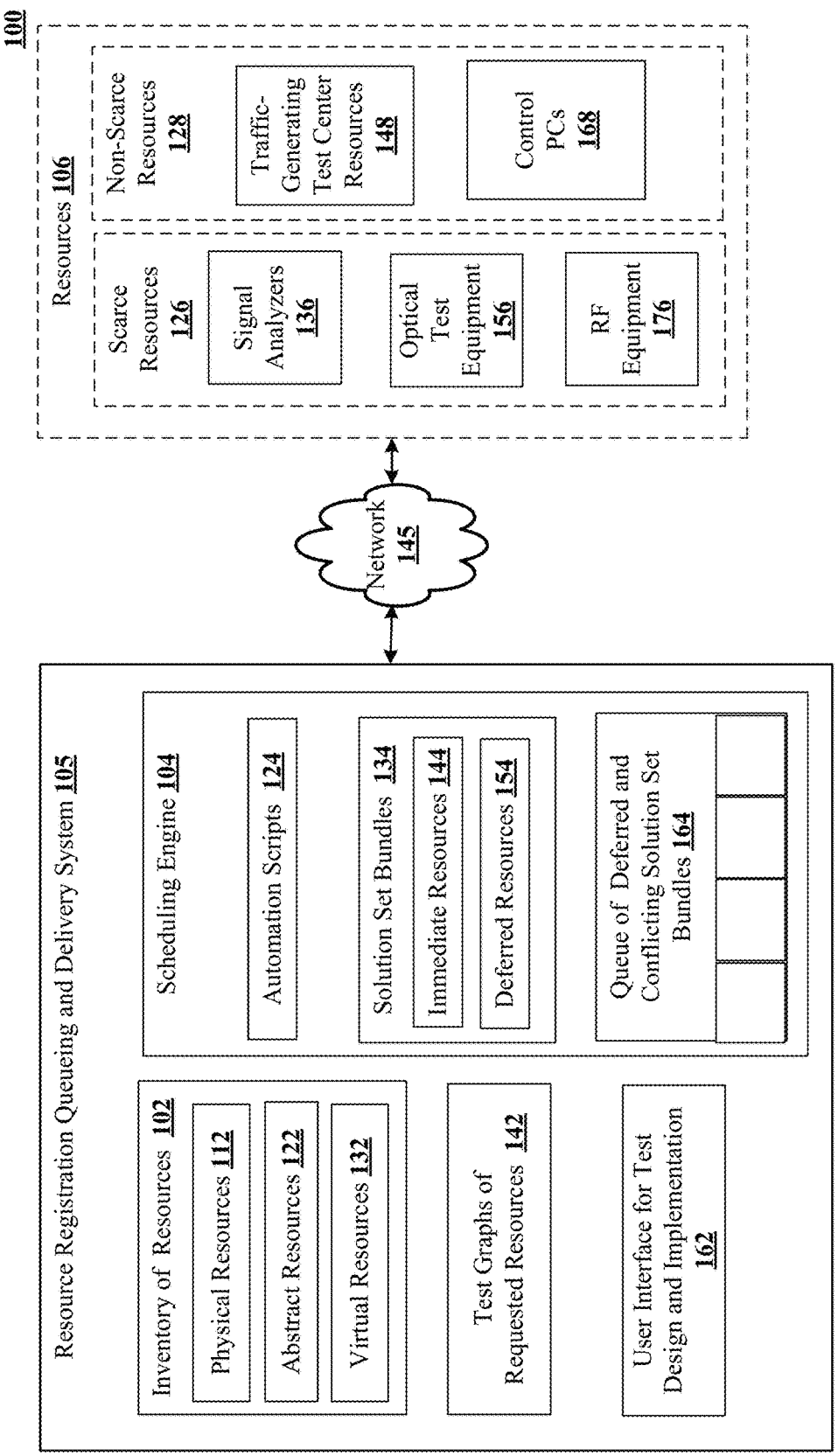
FIG. 1 depicts an exemplary system for delivering scarce test equipment resources to a user within a test organization, according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The disclosed technology makes available the ability to reserve a set of equipment and to specify a test graph for interconnecting the equipment to maximize utilization of the equipment resources. Disclosed queuing distinguishes among scarce equipment capability and more readily available resources, for improving usage and availability within an environment.

In one example use case, expensive optical and cloud based resources are needed for only five minutes during a test cycle described by a test topography for a customer using the test platform. In another example, RF emulators need to be utilized to test a single channel at a time, such as might be needed for 5G prototyping and OTA testing by development teams.

Multiple users of test equipment resources within a test organization often need to use the same expensive instrument for a short period of time. In some cases, multiple users need to use the over the air (OTA) chamber test line. A test organization needs to be able to queue parts of test equipment reservations in the event that the time needed for a scarce resource by multiple users is in conflict, and in some situations in the event of scheduling conflicts the test organization needs to be able to queue the reservation in full.

A reservation request is a request to either reserve a test topology or modify an existing active reservation that cannot complete because some or all of the required resources are unavailable at the moment. As a result, the reservation request for the topology is put in a queue by a human escalation manager, in existing systems.

The disclosed technology significantly enhances previously available test platforms for delivering scarce test equipment resources to a user within a test organization. Two disclosed platform capabilities are (1) an option to queue reservations when there are conflicts and (2) an option to mark topology resources as deferred. Resources marked deferred will not be activated on reservation start. Users will be able to activate and release deferred resources while the reservation is active.

The disclosed technology features an interface for test design and implementation that represents needed equipment capabilities as a network topology, with equipment capabilities required for a test represented by class. Examples of test equipment capability classes are signal analyzer, signal generator and radio frequency test chamber. The technology also includes maintaining an inventory of equipment resources and capabilities by class and by interconnectivity constraints.

The disclosed technology enables automating scheduling of delivery of equipment resources using an automation script for scheduling and activating the needed equipment resources. Test graphs can include the time durations of need of equipment capabilities for multiplexing equipment use. This disclosed scheduling enables more efficient utilization of expensive test equipment and in one case can expand the capacity of OTA testing, using test environment automation for allocation and time multiplexing of scarce resources within a test environment, as described by a test graph.

Next, we describe an example architecture for delivering scarce test equipment resources to a user within a test organization.

Architecture

FIG. 1 shows example architecture 100 for delivering scarce test equipment resources to a user within a test organization. Architecture 100 includes resource registration queuing and delivery system 105 with inventory of resources 102 and scheduling engine 104, network 145 and resources 106. Inventory of resources 102 includes physical resources 112, abstract resources 122 and virtual resources 132. Inventory of resources 102 includes the collection of the resources, ports, and links between ports in the lab. A database that describes the inventory by defining resources and specifying their property settings is utilized in one implementation. Abstract resources 122 allow definition of an abstract resource or port with an associated condition and the abstract resources 122 can provide a library populated with custom conditions. Abstract resources 122 provide an efficient way of creating, re-using and sharing resources across an organization using a specific conditional language. Labeling and selecting resources with specific criteria allows for an efficient workflow of sharing resources across the organization. A library of abstract resources 122 provides the convenience of using the same or similar condition across different topologies. Virtual resources 132 include virtual machine routers and network machines, allowing access to existing virtual resources in a registered Cloud and include these named elements in their test topology graphs for testing purposes. These resources can appear as palette items in an equipment interface for a specific cloud and can be placed in a test topology attached to devices in a specific cloud, in one implementation.

Continuing the description of FIG. 1, resource registration queuing and delivery system 105 also includes test graphs of requested resources 142 and user interface for test design and implementation 162 for use cases that include designing test graphs that utilize manual interconnections. These topologies depict needed equipment capabilities, by class, required for a test and the test graphs also depict time durations for which the equipment capabilities are needed for the test. Resource registration queuing and delivery system 105 further includes scheduling engine 104 with automation scripts 124, solution set bundles 134 and a queue of deferred and conflicting solution set bundles 164. Solution set bundles 134 include immediate resources 144 that are non-scarce resources available for scheduling immediately upon activation of the test graph and deferred resources 154 that are scarce resources that may not be required immediately upon activation and thus are not immediately allocated. The queue of deferred and conflicting solution set bundles 164 places in order the resource bundles that include deferred resources 154, for multiple users to the test system. Deferred resources 154 get resolved on demand, as the scarce resource becomes available. Common resources are required to be reserved only when they are actually needed, and hence may be deferred until required and queued until available. Even though the resources are conceptually part of multiple topologies, they may be reserved only for the required time and not for the entire duration of the topology reservation.

Continuing further the description of FIG. 1, resources 106 includes scarce resources 126 and non-scarce resources 128. Examples of specialized equipment in scarce resources 126 include signal analyzers 136, optical test equipment 156 and RF equipment 176. Additional expensive equipment types can also be included in some implementations. Non-scarce resources 128 include traffic-generating test center resources 148 and control PCs 168 and can include additional readily available equipment resources.

Figure 2A:
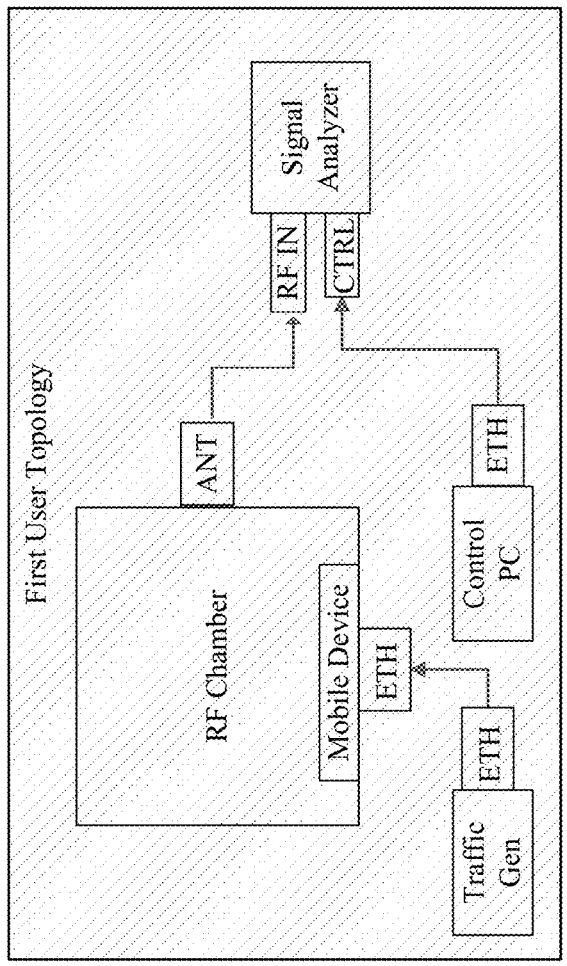
FIG. 2A shows a test graph for a first user.
Figure 2B:
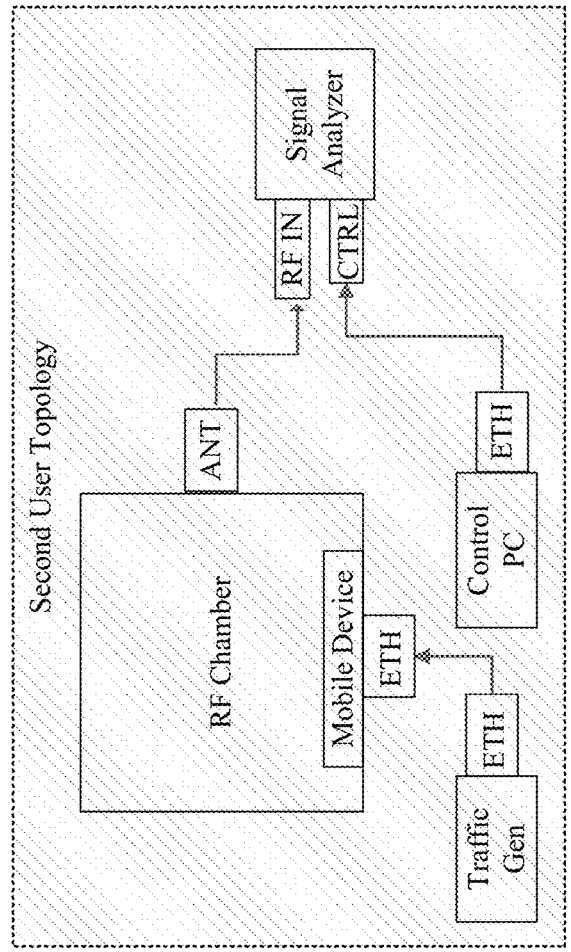
FIG. 2B shows a test graph for a second user.
Figure 3A:
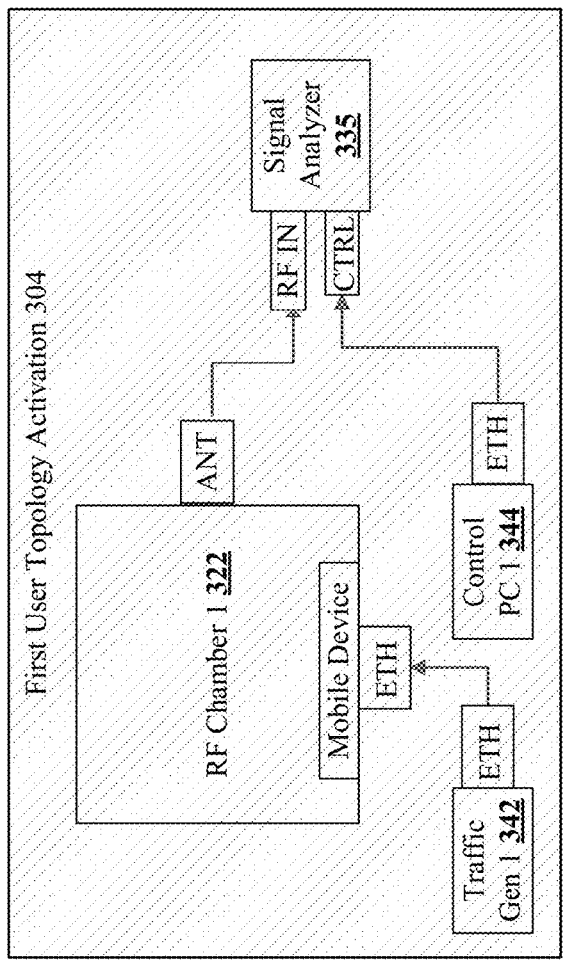
FIG. 3A shows the results of activating the test graph of the first user, in the absence of competition for use of deferred resources.
Figure 3B:
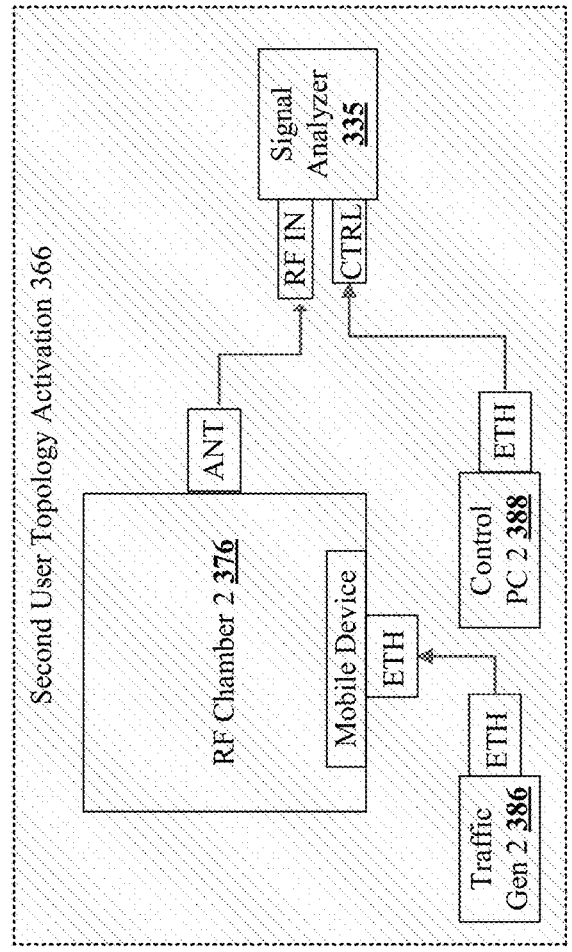
FIG. 3B shows the results of activating the test graph of the second user, in the absence of competition for use of deferred resources.

As an example of queuing a conflicting resource, FIG. 2A shows a test graph for a first user. FIG. 2B shows a test graph for a second user. FIG. 3A shows the results of activating the test graph of the first user 304, in the absence of competition for use of deferred resources. Specific inventory of equipment, non-scarce resources RF chamber 1 322, traffic generator 1 342 and control PC 1 344 are allocated immediately by class and availability. The signal analyzer 335 is a deferred resource that is not required immediately and is not allocated to a specific equipment entity. The user manipulates the test environment as needed until the deferred resource is required, and then requests activation of the deferred resource. If the resource is available, it is reserved and allocated, and the user manipulates the test environment as needed. That is, the test graph resolves with the use of the deferred resource. FIG. 3B shows the results of activating the test graph of the second user 366, in the absence of competition for use of deferred resources. Non-scarce resources RF chamber 2 376, traffic generator 2 386 and control PC 2 388 are allocated immediately by class and availability. The signal analyzer 335 is a deferred resource that is not required immediately and is not allocated. The user manipulates the test environment as needed until the deferred resource is required, and then requests activation of the deferred resource. If the resource is available, it is reserved and allocated, and the user manipulates the test environment as needed. That is, the test graph resolves with the use of the deferred resource.

Resource queuing allows users to create multiple topologies that require the same resources, such as specialized equipment, for a short period within each test graph reservation. For example, a user may create a topology with abstract resources 122 and not choose specific resources, and instead specifying their resource requirements. Using the disclosed technology, the test platform can choose resources that meet the specified criteria and are available during the requested time and can allocate the resources for use. For example, in labs in which resources are pooled together for shared use, users need not choose specific resources for the topologies. Instead, they can specify abstract conditions, for example, "any Dell server with 64 GB memory or more AND running Ubuntu 14.04 LTS". The test platform tracks resource information such as memory and OS resources that meet the specified criteria and are available and can assign the identified equipment to the user's reservation request.

Figure 4:
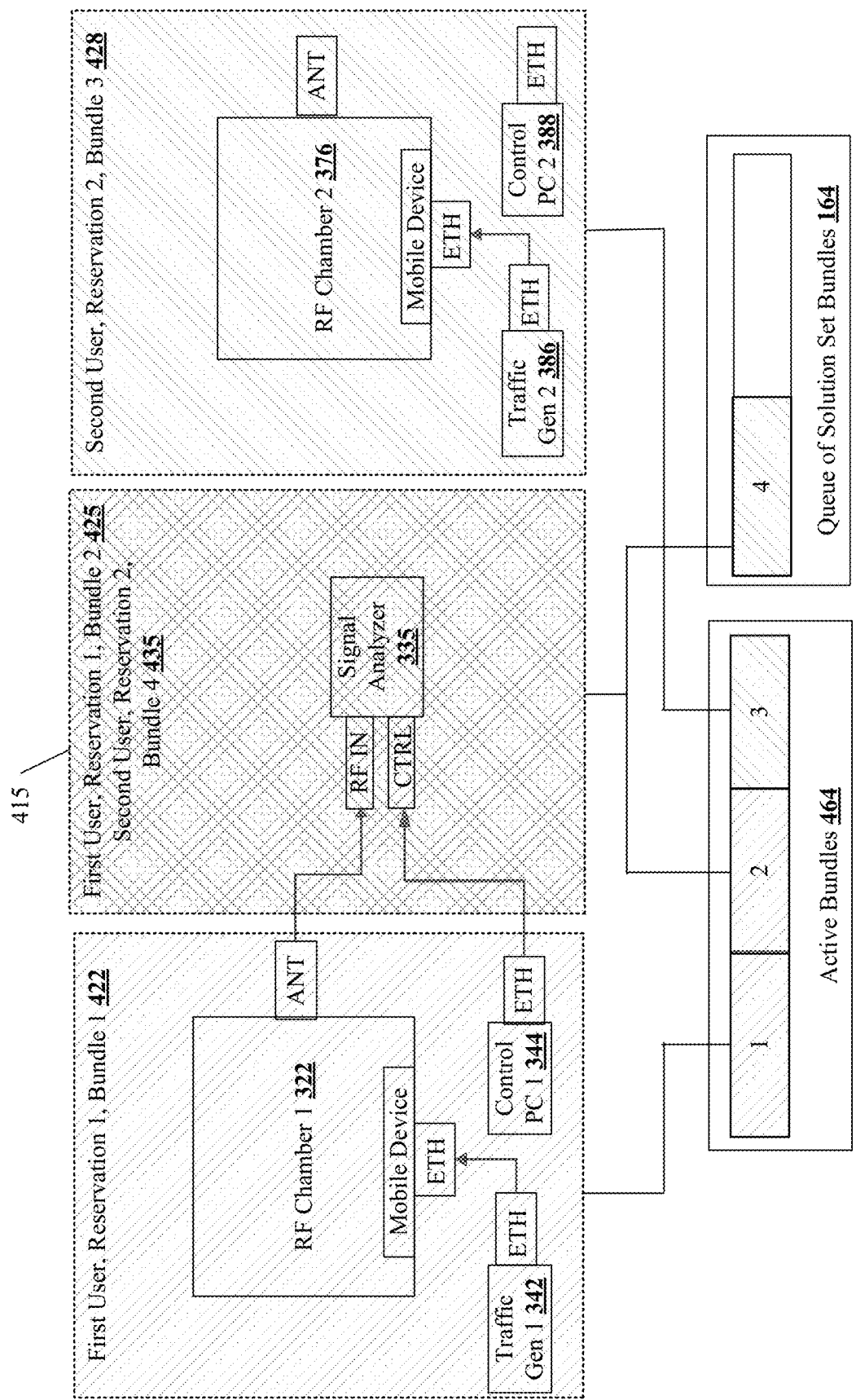
FIG. 4 shows an example scenario in which both a first user and a second user of a test platform seek to activate test topologies that include a scarce resource.

FIG. 4 shows an example scenario in which both a first user and a second user of a test platform seek to activate test topologies that include a scarce resource, signal generator 335. When a reservation is queued, it is queued together with the possible resource sets that can resolve it. Thus, for each reservation, at least one bundle is placed on the queue. That bundle includes the reservation and the resource sets. In this scenario, the first user activates their test graph, resulting in reservation one with bundle one 422, an immediate bundle that includes the non-scarce resources and reservation one with bundle two 425, a deferred bundle that includes the deferred resource that is not required immediately and is not allocated.

Continuing the example description, a second user requests activation of a topology 366 while the first user topology 304 is active. The second user topology includes a deferred resource that is not required immediately and is not allocated: signal analyzer 335. Usage of the deferred resource is effectively multiplexed between two active environments that share that one resource, marked in FIG. 4 with a combination of left-oriented shading for first user topology and right-oriented shading 415 for second user topology. Non-scarce resources are allocated immediately by class and availability. Due to availability of immediate resources, the topology can be resolved when the reservation is activated. The second user manipulates the test environment as needed until the deferred resource is required. In this example, the second user requests activation of deferred resource signal analyzer 335. Only one instance of the scarce resource exists and it is in use. Bundle four 435 containing that resolved resource instance is added to queue of deferred and conflicting solution set bundles 164 behind the other resource bundles that are currently active. Active bundles 464 includes first user reservation one bundle one 422 immediate bundle, first user reservation one bundle two 425 deferred bundle and second user reservation two bundle three 428 immediate bundle. Bundles one, two and three can be active in parallel. Second user reservation two bundle four 435 is a deferred bundle that is added to queue of deferred and conflicting solution set bundles 164. A delay in activation of bundle four for the second user 435 occurs because the scarce resource is in use by first user reservation one bundle two 425.

Figure 5:
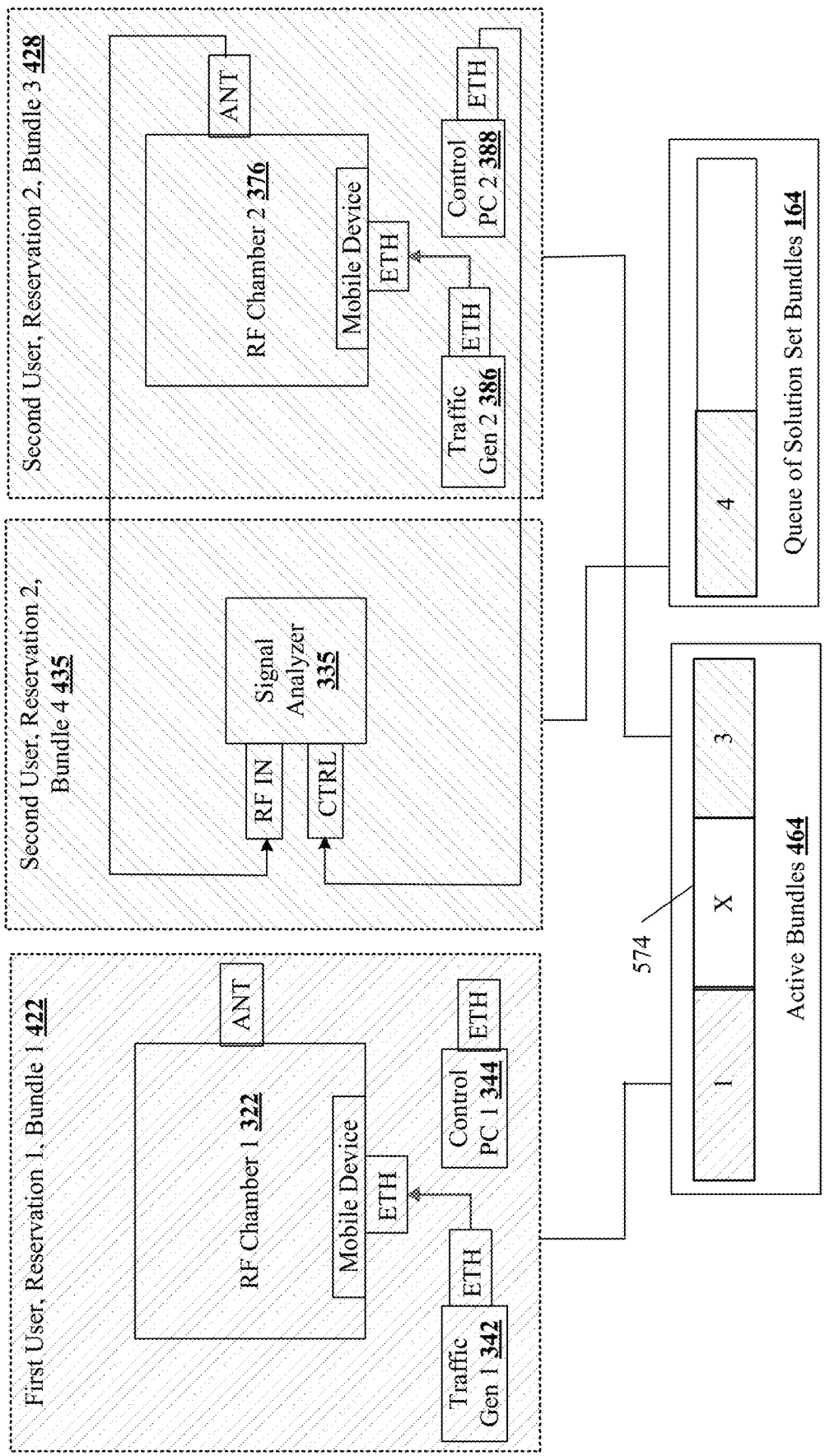
FIG. 5 illustrates the next steps of the example scenario in which both a first user and a second user of the test platform seek to activate test topologies that include a scarce resource, as described relative to FIG. 4.

FIG. 5 shows the next steps of the example scenario in which both a first user and a second user of the test platform seek to activate test topologies that include scarce resource, signal generator 335 described earlier relative to FIG. 4. First user releases scarce resource, signal analyzer 335, as shown by the X 574 displayed in active bundles 464. The disclosed system scans the queue and identifies reservation two bundle four for second user as next in the queue. After reservation one bundle two 425 releases scarce resource, signal analyzer 335, the test system activates reservation two bundle four 435.

Figure 6:
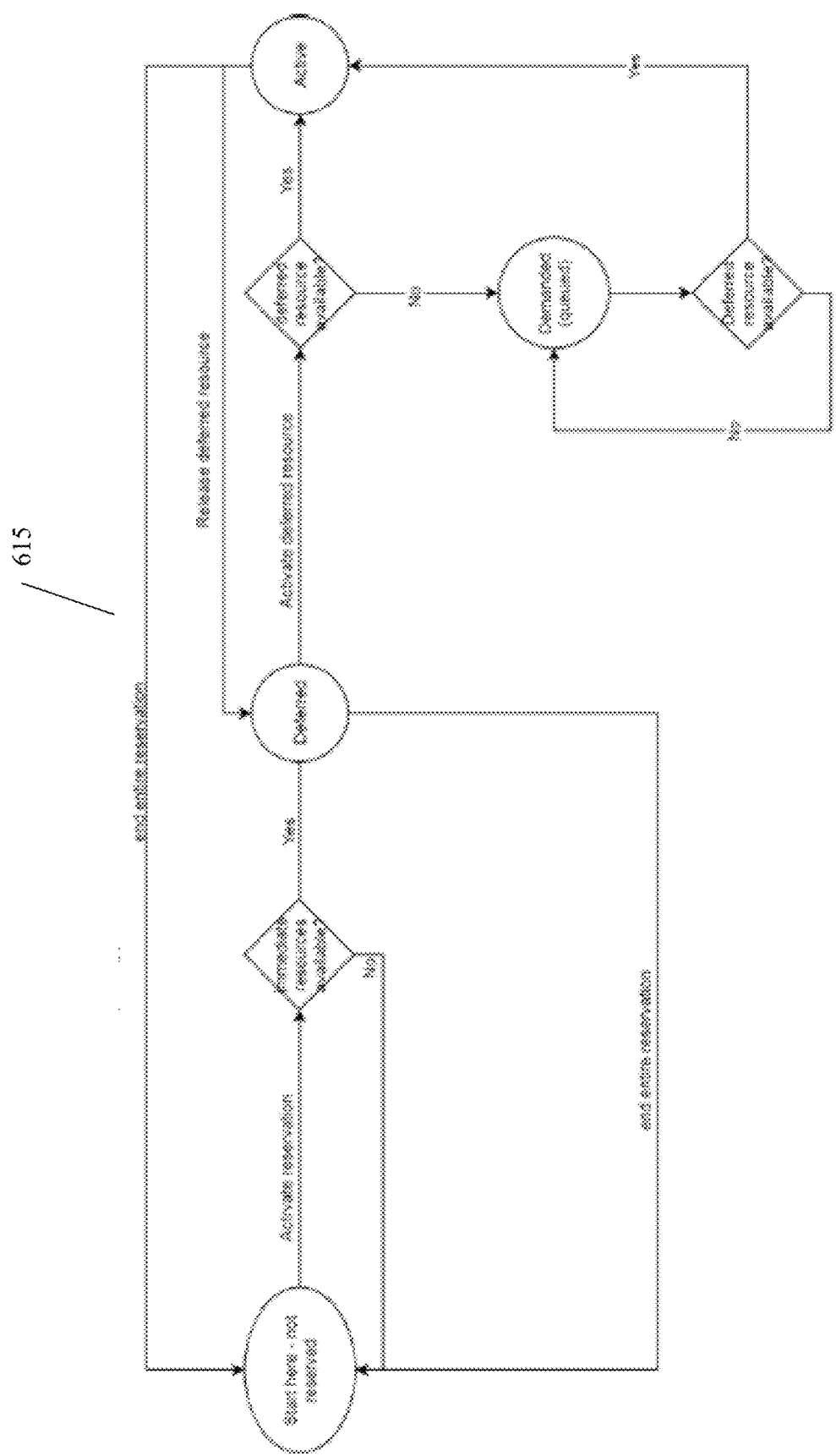
FIG. 6 shows a state diagram for a topology that includes a single deferred resource.

FIG. 6 shows a state diagram 615 for a topology that includes a single deferred resource. The disclosed technology activates the registration for the test graph for a user of the platform. After immediate resources are available, then the system activates deferred resources and queues the demanded resources until they become available. The deferred resources are then activated, and later released and the entire reservation is ended.

Figure 7:
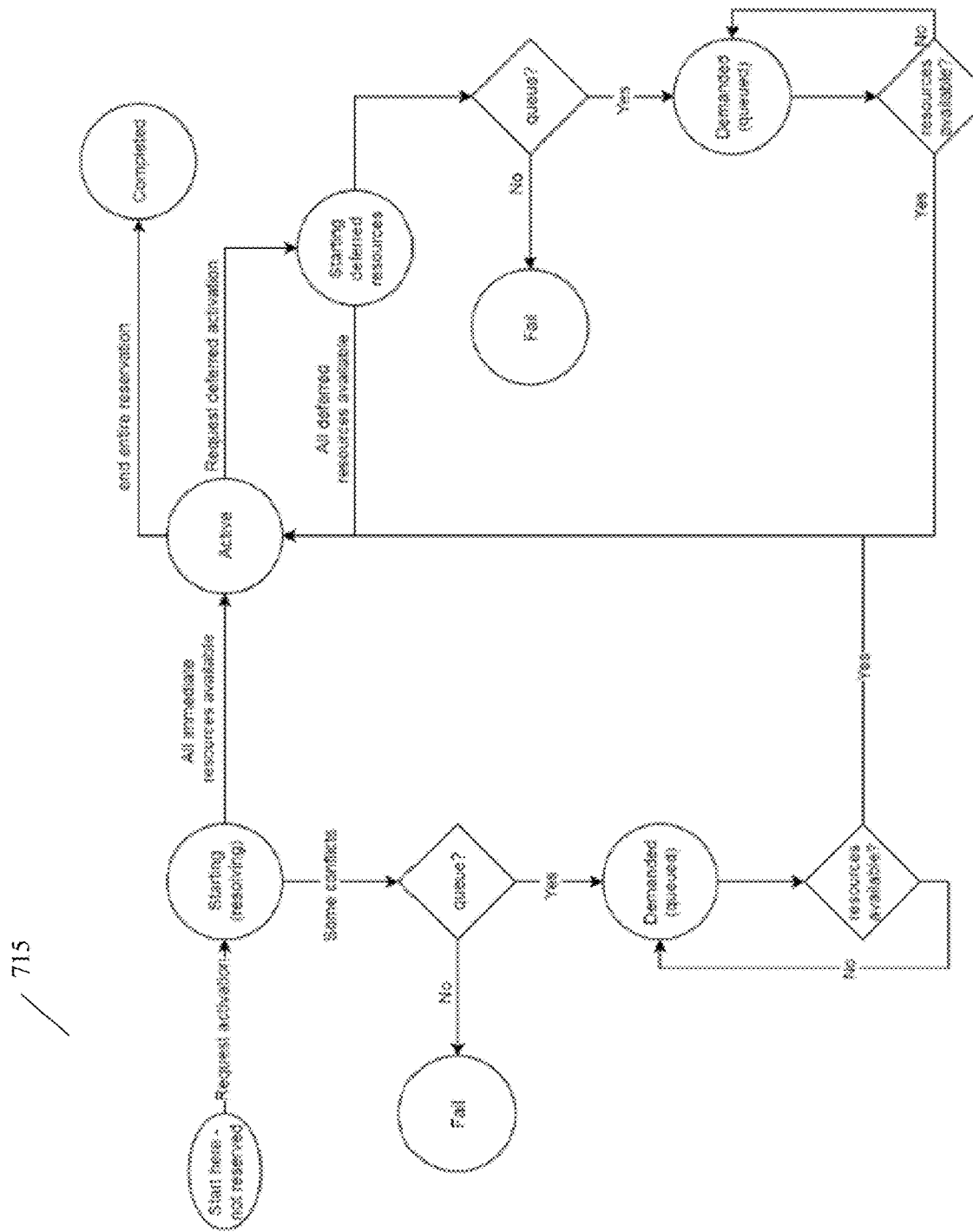
FIG. 7 shows a state diagram for a test graph that includes conflict for resources as well as deferred resources.

FIG. 7 shows a state diagram 715 for a test graph that includes conflict for resources as well as deferred resources. The disclosed technology activates the registration for the test graph for a user of the platform. After immediate resources become available, the system activates deferred resources and queues the demanded resources until they become available. The deferred resources are then activated, and later released and the entire reservation is ended upon completion.

FIG. 8 shows an example script 800 for delivering scarce test equipment resources to a user within a test organization. The script includes reserving a topology containing both immediate and deferred resources, with the specific topology of "R&S_Scenario_topology" 824. "Velocity" in the example refers to the organization's test platform. Connection to the resources to configure 834 is specified in the next step of the example script. The requested scarce resource "R&S FSW" is a signal analyzer. When the reservation is enabled, the script specifies waiting for activation 854 until the resource becomes available. When the scarce resource "R&S FSW" becomes available, the activation script specifies doing the tests and releasing the critical resource, before continuing with the remaining tests and shutting down and releasing 884 the equipment used in the test specified by the test graph.

In one use case, the script for delivering scarce test equipment resources to a user within a test organization is automatic. An automation script requests a test graph to be reserved via the test platform representational state transfer application program interface (REST API) that contains a set of scarce resources to be multiplexed. Scarce resources are grouped as deferred. Scheduling engine 104 activates the test graph, excluding the deferred resources 154. The automation script manipulates the test environment resources 106 as needed. When an appropriate part of test plan is reached, automation script requests deferred resources 154 be activated via REST API. Scheduling engine 104 places the request in queue of deferred and conflicting solution set bundles and notifies the automation script that the request is pending via callback mechanism. Deferred resources become available, causing scheduling engine 104 to reserve resources 106. The automation script is notified by scheduling engine 104 via callback mechanism that resources are available. The automation script uses the test environment as needed then releases scarce resources via REST API when complete. Scheduling engine 104 checks for other queued reservations for that set of resources.

In another use case, the script for delivering scarce test equipment resources to a user within a test organization utilizes manual interconnections. The test platform user requests a test graph to be reserved via the user interface for test design and implementation 162. The test graph contains a set of scarce resources to be multiplexed, with scarce resources grouped as deferred. Scheduling engine 104 activates the test graph, excluding the deferred resources. The user manipulates the test environment as needed. When the appropriate part of the test plan is reached, the user requests deferred resources through the user interface for test design and implementation 162. Scheduling engine 104 places the request in the queue and notifies the user that the request is pending. Deferred resources 154 become available, causing scheduling engine 104 to reserve resources. The user is notified by scheduling engine 104 via email that resources are available and should be manually cabled to the remaining test environment in the test graph. The user uses the test environment as needed and then releases scarce resources via the user interface for test design and implementation 162 when complete. Scheduling engine 104 checks for other queued reservations for that set of resources. The disclosed technology adds a queue for conflicting reservations, and the user can interact with the queue: the user may specify at reservation definition time that on conflict, the reservation will be queued. This is especially useful for reservations scheduled in the future or requested by scripts. To support this an option will be added to the new reservation page. Checking the box shown below means on conflict, the reservation conflict panel is not shown and the reservation is queued. The user can also decide to add the reservation to the queue from a conflict resolution panel in the UI.

Next, we describe an example workflow for delivering scarce test equipment resources to a user within a test organization.

Workflow

Figure 9:
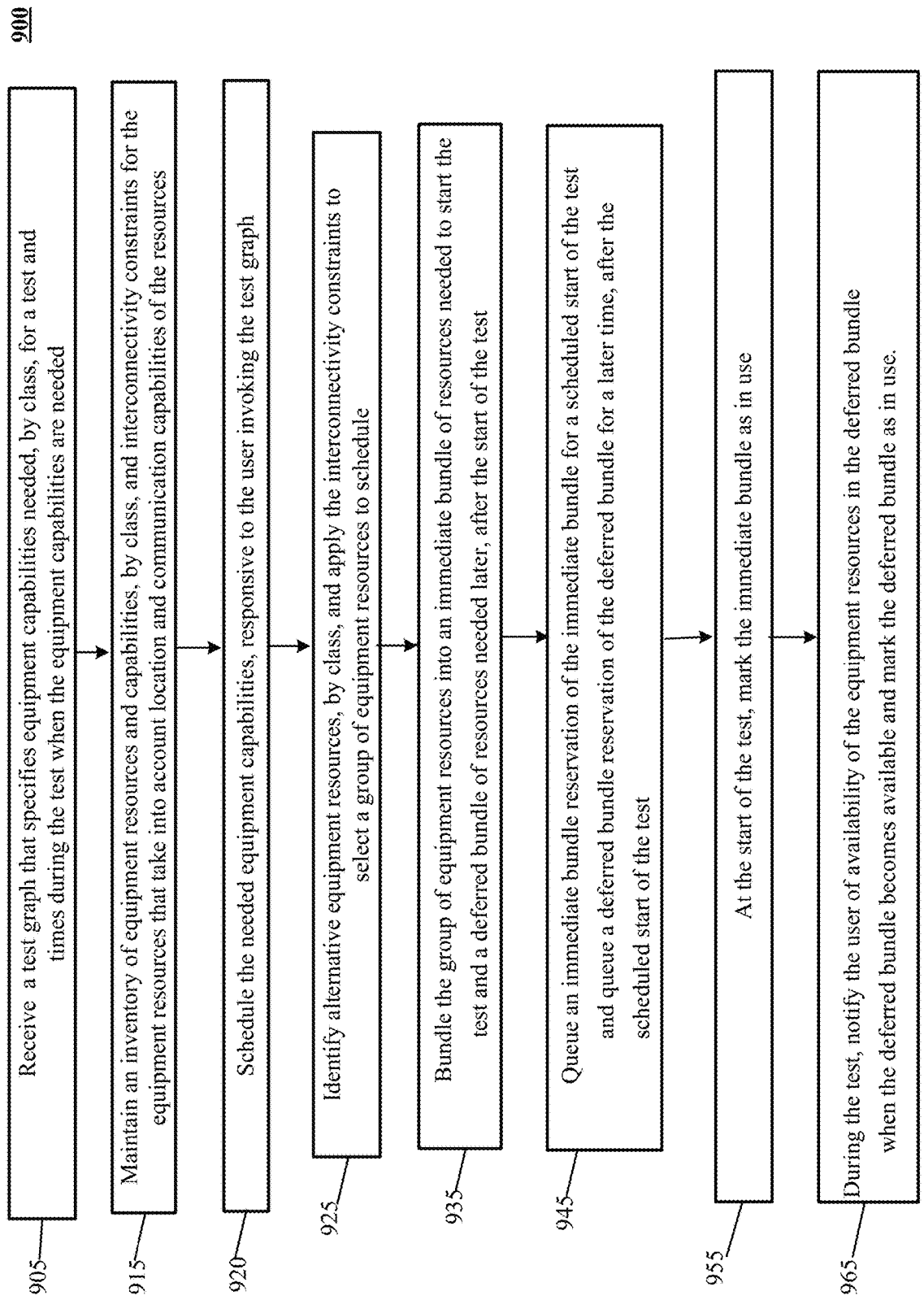
FIG. 9 shows a representative method of delivering scarce test equipment resources to a user within a test organization.

FIG. 9 shows a representative method of delivering scarce test equipment resources to a user within a test organization. Flowchart 900 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to a Spirent test platform.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 9 begins with action 905 receiving via an interface a test graph that specifies equipment capabilities needed, by class, for a test and that further specifies times during the test when the equipment capabilities are needed.

Process 900 continues at action 915 with maintaining an inventory of equipment resources and capabilities, by class, and maintaining interconnectivity constraints for the equipment resources in the inventory that take into account location and communication capabilities of the equipment resources.

The process continues at action 920 with scheduling the needed equipment capabilities, responsive to the user invoking the test graph.

The process continues at action 925 with identifying alternative equipment resources responsive to the equipment capabilities needed, by class, and applying the interconnectivity constraints to select at least one group of equipment resources to schedule.

Action 935 includes bundling the group of equipment resources to schedule into at least an immediate bundle of resources needed to start the test and a deferred bundle of resources needed later, after the start of the test.

Process 900 action 945 is queuing an immediate bundle reservation of the immediate bundle for a scheduled start of the test and queuing a deferred bundle reservation of the deferred bundle for a later time, after the scheduled start of the test.

Action 955 includes at the start of the test, marking the immediate bundle as in use.

Action 965 includes during the test, notifying the user of availability of the equipment resources in the deferred bundle when the deferred bundle becomes available and marking the deferred bundle as in use.

Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

A different representative method utilizes actions for automated testing a connection between a first location and a second location through a counterpart location, to establish a test of audio communications between first and second locations through a counterpart location, utilizing the disclosed audio cross-over cable. Example actions will readily occur to those skilled in the art. A block diagram of a computer system usable for testing a connection between a subscriber and a location with which the subscriber is having problems is described.

Computer System

Figure 10:
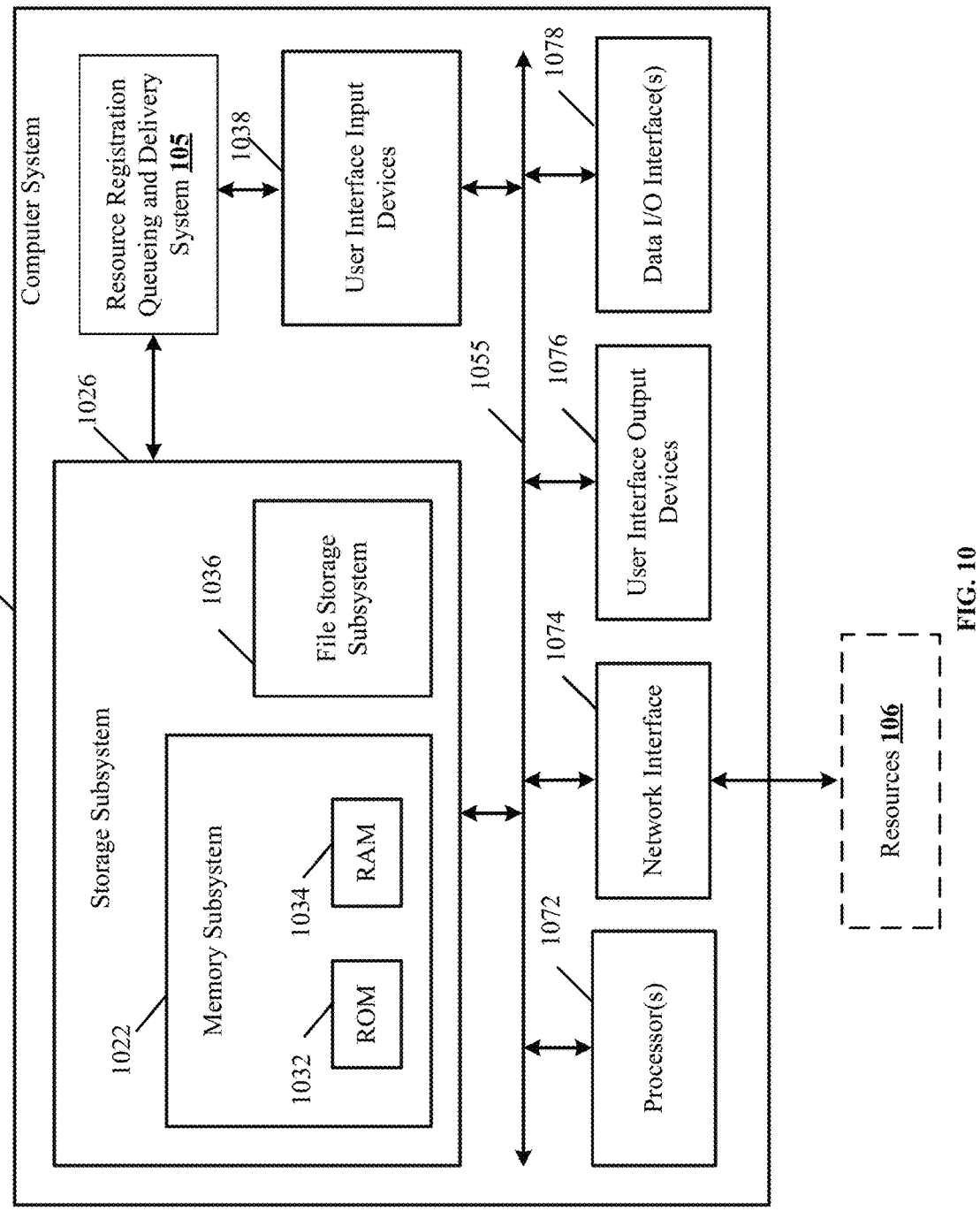
FIG. 10 depicts a block diagram of an exemplary system for delivering scarce test equipment resources to a user within a test organization, according to one implementation of the technology disclosed.

FIG. 10 is a simplified block diagram of a computer system 1010 that can be used for delivering scarce test equipment resources to a user within a test organization.

Computer system 1000 includes at least one central processing unit (CPU) 1072 with resource registration queuing and delivery system 105 that communicates with a number of peripheral devices via bus subsystem 1055. These peripheral devices can include a storage subsystem 1026 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to a communication network 1084, and to corresponding interface devices in other computer systems, including test equipment resources 106.

In one implementation, the resource registration queuing and delivery system 105 of FIG. 1 is communicably linked to the storage subsystem 1026 and the user interface input devices 1038 through network interface 1074. User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a flat-panel device such as a liquid crystal display (LCD), a projection device, a cathode ray tube (CRT), or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1026 stores programming and data constructs that provide the functionality of some or all of the modules and methods described herein.

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the memory subsystem 1022, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

Some Particular Implementations

Some particular implementations and features are described in the following discussion.

In one implementation, a disclosed method of delivering scarce test equipment resources to a user within a test organization includes receiving via an interface a test graph that specifies equipment capabilities needed, by class, for a test and that further specifies times during the test when the equipment capabilities are needed. The method also includes maintaining an inventory of equipment resources and capabilities, by class. Responsive to the user invoking the test graph, the disclosed method further includes scheduling the needed equipment capabilities, including identifying alternative equipment resources responsive to the equipment capabilities needed, by class, and selecting at least one group of equipment resources to schedule; bundling the group of equipment resources to schedule into at least an immediate bundle of resources needed to start the test and a deferred bundle of resources needed later, after the start of the test; and queuing a deferred bundle reservation of the deferred bundle for a later time, after the scheduled start of the test. The disclosed method further includes, during the test, notifying the user of availability of the equipment resources in the deferred bundle when the deferred bundle becomes available and marking the deferred bundle as in use. The class of equipment capability of the scarce test equipment resources is one of signal analyzer, signal generator and radio frequency test chamber, in one implementation and can include additional resources.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Some implementations include maintaining interconnectivity constraints, for the equipment resources in the inventory, that consider location and communication capabilities of the equipment resources. In some cases, the disclosed technology further including applying the interconnectivity constraints to select at least one group of equipment resources to schedule.

One implementation of the disclosed technology includes queuing an immediate bundle reservation of the immediate bundle for a scheduled start of the test, and at the start of the test, marking the immediate bundle as in use.

Some implementations of the disclosed technology include an automation script for scheduling and activating the needed equipment resources. In some cases, the automation script requests a test graph be reserved using a representational state transfer application program interface (REST API) that contains a set of scarce resources to be multiplexed.

In another implementation, a disclosed system includes one or more processors coupled to memory, the memory loaded with computer instructions, when executed on the processors, implement actions of the disclosed method described supra.

In yet another implementation a disclosed tangible non-transitory computer readable storage media is impressed with computer program instructions that, when executed on a processor, implement the disclosed methods described supra.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A computer-implemented method of delivering scarce test equipment resources to a script running as part of a test controlled by a user within a test organization, including:
   receiving via a computer-implemented interface a test graph that specifies equipment capabilities needed, by class, for the test and that further specifies times during the test when the equipment capabilities are needed;
   maintaining in memory, connected to a processor, an inventory of equipment resources and capabilities, by class;
   responsive to the user invoking the test graph, the processor scheduling the needed equipment capabilities, including:
      identifying alternative equipment resources responsive to the equipment capabilities needed, by class, and selecting at least one group of equipment resources to schedule;
      bundling the group of equipment resources to schedule into at least an immediate bundle of resources needed to start the test and a deferred bundle of resources needed later, after the start of the test; and
      queuing a deferred bundle reservation of the deferred bundle for a later time, after the scheduled start of the test; and
   during the test, the processor calling the script with a notification of availability of the equipment resources in the deferred bundle when the deferred bundle becomes available, causing the script to automatically connect to the equipment resources in the deferred bundle to the test, and marking the deferred bundle as in use, so the script gains access the deferred bundle of the equipment resources.

2. The method of claim 1, further including maintaining interconnectivity constraints, for the equipment resources in the inventory, that consider location and communication capabilities of the equipment resources.

3. The method of claim 2, further including applying the interconnectivity constraints to select at least one group of equipment resources to schedule.

4. The method of claim 1, further including queuing an immediate bundle reservation of the immediate bundle for a scheduled start of the test.

5. The method of claim 4, further including at the start of the test, marking the immediate bundle as in use.

6. The method of claim 1, wherein class of equipment capability of the scarce test equipment resources is at least one of signal analyzer, signal generator and radio frequency test chamber.

7. A tangible non-transitory computer readable storage media impressed with computer program instructions that, when executed, deliver scarce test equipment resources to a script running as part of a test controlled by a user within a test organization, including:
   receiving via an interface a test graph that specifies equipment capabilities needed, by class, for the test and that further specifies times during the test when the equipment capabilities are needed;
   maintaining an inventory of equipment resources and capabilities, by class;
   responsive to the user invoking the test graph, scheduling the needed equipment capabilities, including:
      identifying alternative equipment resources responsive to the equipment capabilities needed, by class, and selecting at least one group of equipment resources to schedule;
      bundling the group of equipment resources to schedule into at least an immediate bundle of resources needed to start the test and a deferred bundle of resources needed later, after the start of the test; and
      queuing a deferred bundle reservation of the deferred bundle for a later time, after the scheduled start of the test; and
   during the test, calling the script with a notification of availability of the equipment resources in the deferred bundle when the deferred bundle becomes available, causing the script to automatically connect to the equipment resources in the deferred bundle to the test, and marking the deferred bundle as in use.

8. The tangible non-transitory computer readable storage media of claim 7, further including maintaining interconnectivity constraints, for the equipment resources in the inventory, that consider location and communication capabilities of the equipment resources.

9. The tangible non-transitory computer readable storage media of claim 8, further including applying the interconnectivity constraints to select at least one group of equipment resources to schedule.

10. The tangible non-transitory computer readable storage media of claim 7, further including queuing an immediate bundle reservation of the immediate bundle for a scheduled start of the test.

11. The tangible non-transitory computer readable storage media of claim 10, further including at the start of the test, marking the immediate bundle as in use.

12. A system for delivering scarce test equipment resources to a user within a test organization includes one or more processors coupled to memory, the memory loaded with computer instructions, that when executed on the processors, implement the receiving, maintaining, scheduling, notifying and marking of claim 7.

13. The system of claim 12, further including queuing an immediate bundle reservation of the immediate bundle for a scheduled start of the test.

14. The system of claim 13, further including at the start of the test, marking the immediate bundle as in use.

15. The system of claim 13, further including an automation script for scheduling and activating the needed equipment resources.

16. The system of claim 15, wherein the automation script requests a test graph be reserved using a representational state transfer application program interface (abbreviated REST API) that contains a set of scarce resources to be multiplexed.

17. A computer-implemented method of delivering scarce test equipment resources to a script running as part of a test controlled by a user within a test organization, including:

receiving via a computer-implemented interface a test graph that specifies equipment capabilities needed, by class, for the test and that further specifies times during the test when the equipment capabilities are needed;

maintaining in memory, connected to a processor, an inventory of equipment resources and capabilities, by class;

responsive to the user invoking the test graph, the processor scheduling the needed equipment capabilities, including:

identifying alternative equipment resources responsive to the equipment capabilities needed, by class, and selecting at least one group of equipment resources to schedule;

bundling the group of equipment resources to schedule into at least an immediate bundle of resources needed to start the test and a deferred bundle of resources needed later, after the start of the test; and queuing a deferred bundle reservation of the deferred bundle for a later time, after the scheduled start of the test; and during the test, the processor automatically generating a message to the script containing a notification of availability when the deferred bundle becomes available, causing the script to automatically generate and transmit a message to a human to manually connect the equipment resources in the deferred bundle to the test, and marking the deferred bundle as in use.

\* \* \* \* \*